US009780964B1

(12) United States Patent
Salam et al.

(10) Patent No.: US 9,780,964 B1
(45) Date of Patent: Oct. 3, 2017

(54) SYSTEM AND METHOD FOR RING PROTECTION SWITCHING OVER ADAPTIVE MODULATION MICROWAVE LINKS

(75) Inventors: Samer M. Salam, Vancouver (CA); Jose A. Liste, Sunnyvale, CA (US); Hidde Beumer, Veenendaal (NL)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 13/356,170

(22) Filed: Jan. 23, 2012

(51) Int. Cl.
*H04L 12/437* (2006.01)
*H04L 12/26* (2006.01)
*H04L 12/729* (2013.01)
*H04L 12/801* (2013.01)
*H04L 12/803* (2013.01)

(52) U.S. Cl.
CPC ........ *H04L 12/437* (2013.01); *H04L 43/0811* (2013.01); *H04L 43/0888* (2013.01); *H04L 45/125* (2013.01); *H04L 47/122* (2013.01); *H04L 47/125* (2013.01); *H04L 47/14* (2013.01)

(58) Field of Classification Search
None
See application file for complete search history.

(56) References Cited

U.S. PATENT DOCUMENTS

| | | | |
|---|---|---|---|
| 5,953,312 A | 9/1999 | Crawley et al. | |
| 6,574,280 B1 | 6/2003 | Liau et al. | |
| 6,697,334 B1 | 2/2004 | Klincewicz | |
| 7,558,205 B1 | 7/2009 | Moncada-Elias et al. | |
| 9,161,259 B2 | 10/2015 | Bhandari et al. | |
| 9,392,526 B2 | 7/2016 | Gohite et al. | |
| 2002/0067693 A1 | 6/2002 | Kodialam et al. | |
| 2002/0186658 A1 | 12/2002 | Chiu et al. | |
| 2007/0070883 A1 | 3/2007 | Lysne | |
| 2007/0230346 A1 | 10/2007 | Yamada | |
| 2009/0238067 A1* | 9/2009 | Yamauchi | 370/228 |
| 2010/0039935 A1* | 2/2010 | Davison | H04L 12/4633 370/228 |
| 2010/0172238 A1* | 7/2010 | Saltsidis et al. | 370/228 |
| 2011/0028146 A1* | 2/2011 | Tammisetti | H04L 45/125 455/426.1 |

(Continued)

OTHER PUBLICATIONS

U.S. Appl. No. 13/847,904, filed Mar. 20, 2013 entitled "System and Method for Layer 3 Ring Protection with Adaptive Bandwidth Microwave Links in a Network Environment," Inventors: Shwetha Subray Bhandari, et al.

(Continued)

*Primary Examiner* — Yaotang Wang
(74) *Attorney, Agent, or Firm* — Merchant & Gould P.C.

(57) ABSTRACT

A method is provided in one example and includes determining a bandwidth level associated with a link, which is provided between a first microwave transceiver and a second microwave transceiver. The link is part of a communication ring containing multiple Ethernet ring protection elements. The method also includes comparing the bandwidth level associated with the link to a threshold level. A fail-over can be triggered for a selected one of the plurality of Ethernet ring protection elements if the bandwidth is below the threshold level. In certain example embodiments, the first microwave transceiver and the second microwave transceiver can implement an adaptive modulation protocol on the link.

20 Claims, 6 Drawing Sheets

(56) References Cited

U.S. PATENT DOCUMENTS

| | | | |
|---|---|---|---|
| 2011/0080915 | A1 | 4/2011 | Baykal et al. |
| 2011/0164501 | A1* | 7/2011 | Dunbar ............... H04L 43/0811 370/236.2 |
| 2011/0164505 | A1* | 7/2011 | Salam et al. .................. 370/241 |
| 2012/0093002 | A1* | 4/2012 | Osborne .................... 370/241.1 |
| 2012/0140625 | A1 | 6/2012 | Long |
| 2013/0077559 | A1* | 3/2013 | Nakagawa et al. ........... 370/315 |
| 2013/0148494 | A1* | 6/2013 | Abbas .................. H04L 47/746 370/225 |
| 2013/0201820 | A1* | 8/2013 | Xiaoyong et al. ............ 370/220 |
| 2014/0254347 | A1 | 9/2014 | Xie et al. |
| 2014/0341037 | A1* | 11/2014 | Racz .................... H04L 47/122 370/235 |
| 2015/0055486 | A1 | 2/2015 | Maggiari et al. |
| 2015/0208260 | A1 | 7/2015 | Ahlqvist et al. |
| 2015/0382229 | A1 | 12/2015 | Bhandari et al. |
| 2016/0286462 | A1 | 9/2016 | Gohite et al. |

OTHER PUBLICATIONS

Stan Kurkovsky, "Computer Networks Routing Algorithms," Based on Computer Networking, 4$^{th}$ Edition by Kurose and Ross, [retrieved and printed Dec. 12, 2012], 11 pages; http://www.cs.ccsu.edu/~stan/classes/cs490/slides/networks4-ch4-4.pdf.
Aviv Ronai, et al., "Flex Your Backhaul Network with Adaptive Coding & Modulation," White Paper, Ceragon Networks®, © May 2008, 9 pages.
Cisco Systems, Inc., "Multi-Topology Routing," © 2007-2010, 68 pages.
J. Moy, "OSPF Version 2," Network Working Group, RFC 2328, Apr. 1998, 245 pages; http://www.ietf.org/rfc/rfc2328.txt.
Rainer Baumann, et al., "A Survey on Routing Metrics," TIK Report 262, Computer Engineering and Networks Laboratory, Switzerland, Feb. 10, 2007, 53 pages.
Int'l Telecommunication Union (ITU), G.8013/Y.1731, "Series G: Transmission Systems and Media, Digital Systems and Networks," Jul. 2011, 92 pages.
Hao Long, et al., "Proposal on adding bandwidth degradation message in Y.1731," Telecommunication Standardized Sector Study Period 2009-2012, Huawei Technologies Co., Ltd., May 2010; 5 pages.
U.S. Appl. No. 13/903,767, filed May 28, 2013 entitled "Protection Against Fading in a Network Ring," Inventors: Pravin K. Gohite, et al.
ITU-T Q9-SG 15 (Mar. 2008), "G.8032 Ethernet Ring Protection Overview," Institute of Electronics and Electrical Engineering, Mar. 2008, 23 pages.
ITU-T G.8032/Y.1344 (Feb. 2012), "Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Transport: Ethernet ring protection switching," International Telecommunication Union Telecommunication Standardization Sector (ITU-T), Feb. 2012; Printed in Geneva, Switzerland; 104 pages.
ITU-T G.8013/Y.1731 Corrigendum 1 (Oct. 2011), :Series G; Transmission Systems and Media, Digital Systems and Networks, Packet over Transport Aspects—Ethernet over Transport Aspects; Series y: Global Information Infrastructure, Internet Protocol Aspects and Next-Generation Networks, Internet Protocol Aspects—Operation, Administration and Maintenance; OAM Functions and Mechanisms for Ethernet based networks, Corrigendum 1, International Telecommunication Union Telecommunication Standardization Sector (ITU-T), G.8013/Y.1731 Corrigendum 1, Oct. 2011, 12 pages.
ITU-T G.8013/Y.1731 Amendment 1 (May 2012), "Series G: Transmission Systems and Media, Digital Systems and Networks, Packet over Transport Aspects—Ethernet over Transport Aspects; Series &: Global Information Infrastructure, Internet Protocol Aspects and Next-Generation Networks, Internet Protocol Aspects—Operation, Administration and Maintenance; OAM functions and mechanism for Ethernet based networks Amendment 1," International Telecommunication Union Telecommunication Standardization Sector (ITU-T), G.8013/Y.1731 Corrigendum Amendment 1, May 2012, 16 pages.
Lakshman, Umesh, et al., "MPLS Traffic Engineering," Ciscopress. com, Jan. 13, 2006, http://www.ciscopress.com/articles/printerfriendly.asp?p=426640, 34 pages.
ITU-T G.808.1 (Feb. 2010) "Series G: Transmission Systems and Media, Digital Systems and Networks, Digital Networks—General Aspects; Generic protection switching—Linear trail and subnetwork protection," International Telecommunication Union Telecommunication Standardization Sector (ITU-T), G.808.1, Feb. 2010, 68 pages.
ITU-T G.808.1 Amendment 1 (Aug. 2012), "Series G: Transmission Systems and Media, Digital Systems and Networks, Digital Networks—General Aspects; Generic protection switching—Linear trail and subnetwork protection, Amendment 1," International Telecommunication Union Telecommunication Standardization Sector (ITU-T), G.808.1 Amendment 1, Aug. 2012, 14 pages.
ITU-T G.808.1 Amendment 2 (Sep. 2012) Series G: Transmission Systems and Media, Digital Systems and Networks, Digital Networks—General Aspects; Generic protection switching—Linear trail and subnetwork protection; Amendment 2: New Appendix VII—Solution for Service protection in dynamic bandwidth networks, International Telecommunication Union Telecommunication Standardization Sector (ITU-T), G.808.1 Amendment 2, Sep. 2012, 10 pages.
U.S. Appl. No. 14/844,448, filed Sep. 3, 2015, entitled "System and Method for Layer 3 Ring Protection with Adaptive Bandwidth Microwave Links in a Network Environment," Inventors: Shwetha Subray Bhandari, et al.
USPTO Jun. 19, 2015 Notice of Allowance from U.S. Appl. No. 13/847,904.
USPTO Oct. 2, 2015 Final Office Action from U.S. Appl. No. 13/903,767.
USPTO Mar. 13, 2015 Non-Final Office Action from U.S. Appl. No. 13/847,904.
USPTO Mar. 24, 2015 Non-Final Office Action from U.S. Appl. No. 13/903,767.
U.S. Appl. No. 15/178,322, filed Jun. 9, 2016 entitled "Protection Against Fading in a Network Ring," Inventors: Pravin K. Gohite, et al.
USPTO Mar. 11, 2016 Notice of Allowance from U.S. Appl. No. 13/903,767.
USPTO Feb. 13, 2017 Non-Final Office Action from U.S. Appl. No. 14/844,448.

\* cited by examiner

SYSTEM AND METHOD FOR RING PROTECTION SWITCHING OVER ADAPTIVE MODULATION MICROWAVE LINKS

TECHNICAL FIELD

This disclosure relates in general to the field of communications and, more particularly, to a system and a method for ring protection switching over adaptive modulation microwave links.

BACKGROUND

Networking architectures have grown increasingly complex in communications environments, particularly mobile wireless environments. Wireless communication technologies are used in connection with many applications, including satellite communications systems, portable digital assistants (PDAs), laptop computers, mobile devices (e.g., cellular telephones, user equipment), etc. Wireless communication technologies are handling increasing amounts of data traffic volume, and the types of data being transported through mobile wireless networks have changed dramatically. This is in part because mobile devices are becoming more sophisticated and, further, the mobile devices are able to engage in more data-intensive activities such as displaying movies, playing video games, etc. In many instances, the data sought for delivery is dropped, fragmented, delayed, or simply unavailable to certain end users. Hence, there is a challenge in providing an appropriate delivery strategy to account for these problematic network scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes determining a bandwidth level associated with a link, which is provided between a first microwave transceiver and a second microwave transceiver. The link can be part of a communication ring containing multiple Ethernet ring protection elements (e.g., instances, mechanisms, modules as defined by certain standards, etc.). The method also includes comparing the bandwidth level associated with the link to a threshold level. A fail-over can be triggered for a selected one of the plurality of Ethernet ring protection elements if the bandwidth is below the threshold level. In certain example embodiments, the first microwave transceiver and the second microwave transceiver can implement an adaptive modulation protocol on the link.

In more specific implementations, the method may include receiving first data associated with the link from a maintenance endpoint (MEP) that is responsible for detecting a loss of connectivity on the link; and receiving second data, which is associated with adaptive bandwidth information advertised by the first microwave transceiver. In yet other examples, the method may include receiving bandwidth information for the link, wherein the bandwidth information is provided in a type length value (TLV) within a continuity check message (CCM).

Triggering the fail-over can involve communicating a ring automatic protection switching message that includes a signal fail condition, a signal degrade condition, a manual switch condition, etc. Additionally, the communication ring may be assigned an individual bandwidth threshold for triggering a particular fail-over. Each of the Ethernet ring protection elements can be assigned an individual bandwidth threshold for triggering a particular fail-over. Based on these assignments, the method could additionally include comparing the bandwidth level against the assigned individual bandwidth threshold for each Ethernet ring protection element in order to apply the particular fail-over on a particular one of the Ethernet ring protection elements. The method may also include reversing the fail-over in response to the bandwidth level rising above the threshold level.

Example Embodiments

Figure 1A:
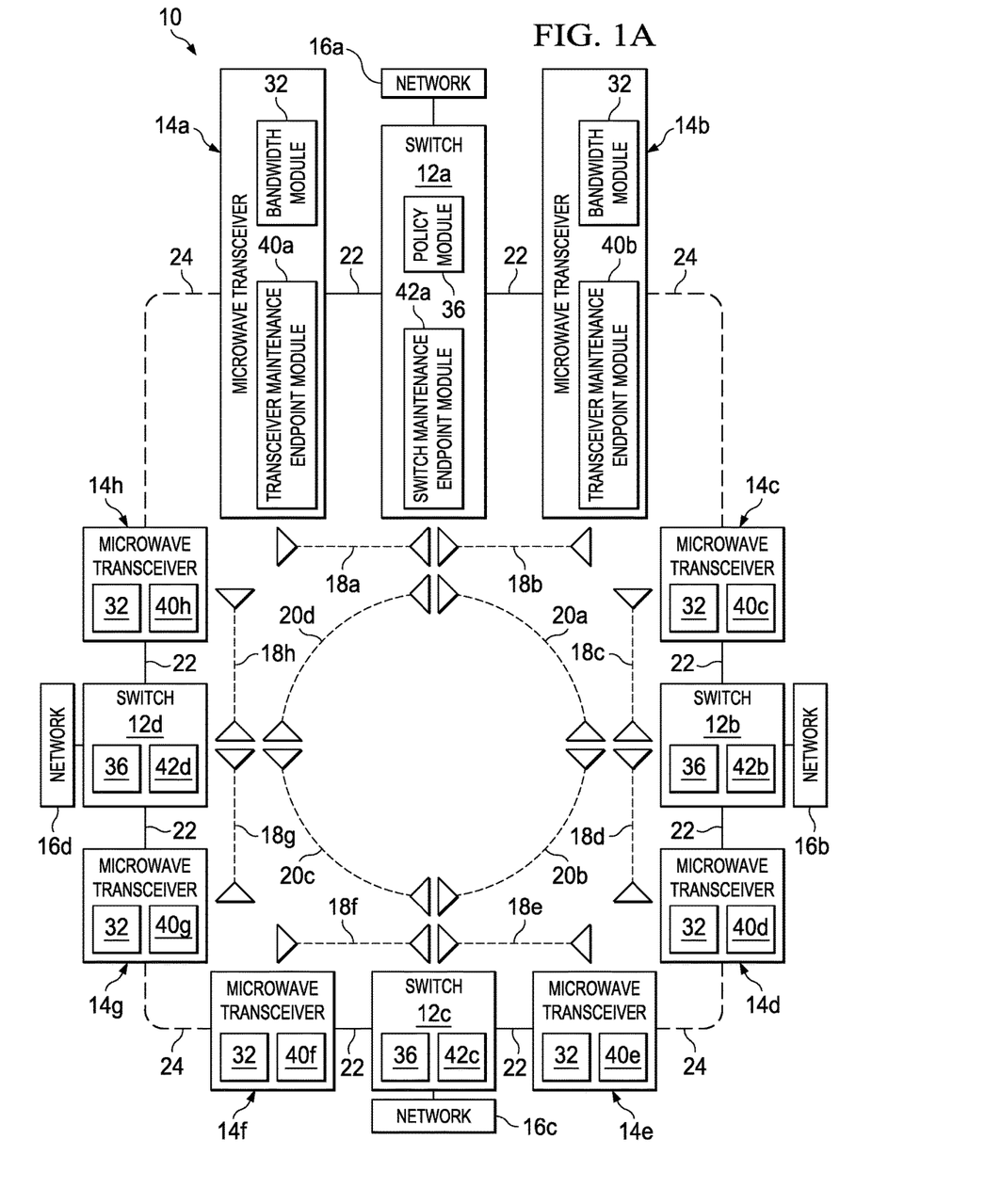
FIG. 1A is a simplified block diagram of a communication system for providing ring protection switching over adaptive modulation microwave links in accordance with one embodiment of the present disclosure.

Turning to FIG. 1A, FIG. 1A is a simplified block diagram of a communication system 10 for providing ring protection switching over adaptive modulation microwave links in accordance with one embodiment of the present disclosure. FIG. 1A may include a plurality of switches 12a-d, microwave transceivers 14a-h, networks 16a-d, transceiver maintenance associations (T-MA) 18a-h, switch MAs (S-MA) 20a-d, Ethernet links 22, and microwave links 24. Each microwave transceiver 14a-h may include a bandwidth module 32 and a transceiver maintenance endpoint module (T-MEM) 40a-h. Each switch 12a-d may include a policy module 36 and a switch MEM (S-MEM) 42a-d. Policy module 36 may be an Ethernet ring protection (ERP) control module as defined in ITU-T G.8032.

Communication system 10 is configured to allow an Ethernet ring to adapt and trigger protection switching based on bandwidth degradation conditions, rather than complete loss of connectivity only. Communication system 10 may not require any change to existing protocol messages and, therefore, can be deployed to existing rings by upgrading Ethernet switches connected to microwave transceivers. The mechanism for triggering the protection switching is based on adaptive bandwidth information from transceivers 14a-h, as further detailed herein.

For purposes of illustrating certain example techniques of communication system 10, it is important to understand how typical communications may traverse the network. The following foundational information may be viewed as a basis from which the present disclosure may be properly explained. Microwave radios make up a significant part of last-mile backhaul connections. Traditional microwave radios employed a fixed modulation schemes, where any degradation in the wave propagation conditions (e.g., due to fog, rain, snow, etc.) led to a complete loss of signal and a disruption of traffic. Thus, the radio link had a binary state of either 'available' (on) or 'not available' (off).

Newer microwave radios use an adaptive modulation scheme. When the link degrades due to weather conditions, the radio changes its modulation scheme to a more robust modulation scheme. The radio continues to work, but operates with less capacity. As a result, the radio can be in several capacity or bandwidth states, and not just on or off. Microwave links are often used in Ethernet rings (e.g., ITU-T G.8032 rings) for Radio Access Network (RAN) backhaul. In these ring topologies, capacity degradation can affect one side of the ring, while the other side is still operating at nominal throughput. In the case of congestion over the radio link, typical microwave transceivers prioritize the Ethernet traffic, and discard lower priority frames.

Using knowledge of the capacity for each radio link, switches can optimize their traffic forwarding rules, and choose the better direction over the ring to maximize traffic throughput. However, standard ring protection switching is triggered by failures when a complete loss of continuity is detected by the ring nodes (e.g., via a loss of connectivity fault management (CFM) Continuity Check messages in the case of an ITU-T G.8032 ring). Therefore, these protocols (as currently defined) are unusable in the case of microwave links with adaptive modulation. For example, if the control/OAM protocol used for failure detection is tagged as high priority traffic, the control/OAM frames will pass over the degraded (congested) microwave links and no protection switching is triggered. If the control/OAM protocol for failure detection is tagged as low priority traffic, then momentary congestion over native Ethernet (i.e., non-microwave) links could lead to loss of continuity and spurious protection switching. As a result current ring protection switching schemes do not fit the needs of deployments with adaptive modulation microwave links.

Certain microwave management techniques focus on the protocol encoding for transferring the bandwidth information from the microwave transceiver to the Ethernet switch. However, such techniques fail to account for this information in the context of ring protection switching on the switches/bridges. For example, ITU-T G.8032 defines Ethernet Ring Automated Protection switching; however, this protocol only defines certain triggers for failover. The triggers can include: 1) a complete loss of continuity over the ring, as detected by the loss of CFM Continuity Check Messages; 2) unidirectional failures over the ring, as detected by the receipt of Remote Defect Indication (RDI) flag in Continuity Check messages; and 3) an administrative configuration (i.e., manual switchover or forced switchover). These strategies fail to define procedures or mechanisms for protection switching based on the available link bandwidth information.

In accordance with one example implementation, communication system 10 can resolve the aforementioned issues (and potentially others) associated with ring protection switching. For example, the architecture of FIG. 1 shows a G.8032 ring topology, where switches 12a-d may be Ethernet switches connected over Ethernet links to microwave transceivers 14a-h. Microwave transceivers 14a-h are connected pairwise using microwave links 24. In an embodiment, microwave transceivers 14a-h execute CFM/Y.1731 operations, but do not participate in G.8032 protocol. Switches maintain two CFM maintenance associations (MAs) per segment (a segment is from one switch to another switch). One MA extends from switch to switch (e.g., S-MA 20a from switch 12a to switch 12b), and another MA extends between a switch and a directly connected transceiver (e.g., T-MA 18a from switch 12a to microwave transceiver 14a).

In an example scenario, the quality of the microwave link between two microwave transceivers degrades (e.g., due to rain). The two microwave transceivers may transition to adaptive modulation and reduce the bandwidth of the link to a certain value BWx. One microwave transceiver informs a switch associated with the microwave transceiver of the new bandwidth via a CFM/Y.1731 message over a MA. For example, microwave transceiver 14a may inform switch 12a of the new bandwidth on microwave link 24 using T-MA 18a. The information could be carried as a type length value (TLV) within a continuity check message (CCM) transmitted by a maintenance endpoint (MEP) or, a new Y.1731 message may be used. Similarly, the second microwave transceiver on the other side of the degraded link also informs a switch associated with the second transceiver of the new bandwidth.

In an embodiment, the switches execute an enhanced version of G.8032 Ring APS (R-APS), whereby the protection switching is based on the detection of CFM loss of continuity and the adaptive bandwidth information. For example, an ERP control module (e.g., as defined in G.8032) can process information from two MEPs per port (as opposed to one MEP in the case of the G.8032 standard). The first MEP is responsible for detecting loss of connectivity over the segment (via loss of continuity check messages or receipt of AIS or RDI). The second MEP informs the ERP module of the bandwidth information advertised by the microwave transceiver.

The ERP module is configured to evaluate the received bandwidth information against configured thresholds. These thresholds may be provided per physical ring, or defined on a per logical ERP instance basis. The threshold essentially indicates the maximum bandwidth required for the whole set of virtual local area networks (VLANs) in an ERP instance (or cumulatively for the ring). Note that this information can be easy to access as part of the capacity planning of the RAN backhaul network because a given VLAN is typically associated with a NodeB whose radio spectrum dictates a maximum bandwidth that the end subscribers may share. Based on the bandwidth information, the ERP module may decide to fail-over one or more ERP instances to the other direction of the ring, such that the traffic associated with the remaining instances that continue to traverse the degraded microwave link do not exceed its new bandwidth (BWx). In another embodiment, a fail-over of all ERP instances may be triggered on the ring when the reported microwave link bandwidth drops below a ring-wide threshold.

The ERP module is extended to transmit Ring Automated Protection Switching (R-APS) messages with signal fail (SF), Signal Degrade (SD), or Manual Switch (MS) code to trigger the fail-over of one or more ERP instances, based on an evaluation of the received bandwidth information against the configured threshold(s). Note that this is different from the G.8032 standard, where a SF condition is only declared based on continuity check message (CCM) timeouts, or based on receiving a remote defect indication (RDI). When the bandwidth of the microwave link is restored to its nominal value, the ERP module may clear the SF (or SD or MS) condition in order to revert the instances back to the original path. Note that the bandwidth evaluation may be rerun repeatedly as the Ethernet switch receives updated information from the microwave transceiver. Based on the updates, the switch may decide to revert a subset (but not all) of the ERP instances.

For example, there may be three ERP instances (ERP1, ERP2, and ERP3) on the ring, whose bandwidth thresholds are BW1, BW2, and BW3 respectively. Further, assume that BW1 is greater than BWx; BW2 is greater than BWx; and BW3 is less than BWx. The ERP module can reroute instances ERP1 and ERP2 over the other direction of the ring, and maintain instance ERP3 over the degraded link. This is done by transmitting R-APS with SF (or SD or MS) to unblock the port connecting for instances ERP1 and ERP2. Hence, the configuration of communication system 10 is providing ring protection switching over adaptive modulation microwave links, and allow an Ethernet ring to adapt and to trigger protection switching based on bandwidth degradation conditions, rather than solely relying on a complete loss of connectivity. Note that the broad term 'trigger' as used herein in this Specification is meant to include initiating, starting, executing, signaling, or otherwise performing a given operation.

Certain embodiments of the present disclosure may offer various advantages over existing microwave management systems. For example, the activities outlined herein are superior to ITU-T G.8032 because they allow the ring to adapt and trigger protection switching based on bandwidth degradation conditions: rather than complete loss of connectivity only. Additionally, certain embodiments discussed herein would not necessarily require any changes to the G.8032 protocol messages. This would allow for the solution to be deployed to existing rings by simply upgrading the Ethernet switches connected to microwave transceivers. The other switches on the ring would only need to support the standard. In addition, the present disclosure can offer a mechanism for ring protection switching based on adaptive bandwidth information. Certain systems focus on the encoding of messages to carry the bandwidth information from the microwave transceiver to the switches, but fail to define a mechanism by which the switch is to process this information. Communication system 10 defines such a mechanism in order to address the aforementioned ring protection switching scenarios, as previously discussed. Before turning to additional capabilities and functions associated with the present disclosure, the infrastructure of the architecture is briefly discussed.

Networks 16a-d represent a series of points or nodes of interconnected communication paths for receiving and transmitting packets of information that are delivered to communication system 10. Networks 16a-d offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Networks 16a-d may implement a UDP/IP connection and use a TCP/IP communication language protocol in particular embodiments of the present disclosure. Further, network 16a-d may implement any other suitable communication protocol for transmitting and receiving data packets to communication system 10.

The architecture of the present disclosure can be associated with a service provider Radio Access Network (RAN) backhaul deployment. In other examples, the architecture of the present disclosure would be equally applicable to other communication environments, cable scenarios, microwave systems generally, broadband generally, fixed wireless instances, fiber to the x (FTTx), which is a generic term for any broadband network architecture that uses optical fiber in last-mile architectures, and any other suitable networking architectures. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

Data, as used herein in this document, refers to any type of numeric, voice, video, media, or script data, or any type of source or object code, or any other suitable information in any appropriate format that may be communicated from one point to another. The term 'data stream', as used herein, includes any type of packet exchange, which may be related to any type of video, numeric, voice, media, script data, or any type of source or object code, or any other suitable information in any appropriate format that may be communicated from one point to another in the network. This can include routine network communications, unicast communications, point-to-point communications, multicast communications, or any other suitable network communication that may be carried on communication system 10.

Switches 12a-d and microwave transceivers 14a-h are network elements that can facilitate the ring protection switching activities discussed herein. As used herein in this Specification, the term 'network element' is meant to encompass routers, transceivers, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, switches 12a-d and microwave transceivers 14a-h include software to achieve (or to foster) the ring protection switching activities discussed herein. This could include the implementation of instances of bandwidth module 32, T-MEM 40a-h, policy module 36, and/or S-MEM 42a-d. Additionally, each of these elements can have an internal structure (e.g., a processor, a memory element, etc.) to facilitate some of the operations described herein. In other embodiments, these ring protection switching activities may be executed externally to these elements, or included in some other network element to achieve the intended functionality. Alternatively, switches 12a-d and microwave transceivers 14a-h may include software (or reciprocating software) that can coordinate with other network elements in order to achieve the ring protection switching activities described herein. In still other embodiments, one or several devices may include any suitable algorithms, hardware, software, components, modules, interfaces, or objects that facilitate the operations thereof.

Figure 1B:
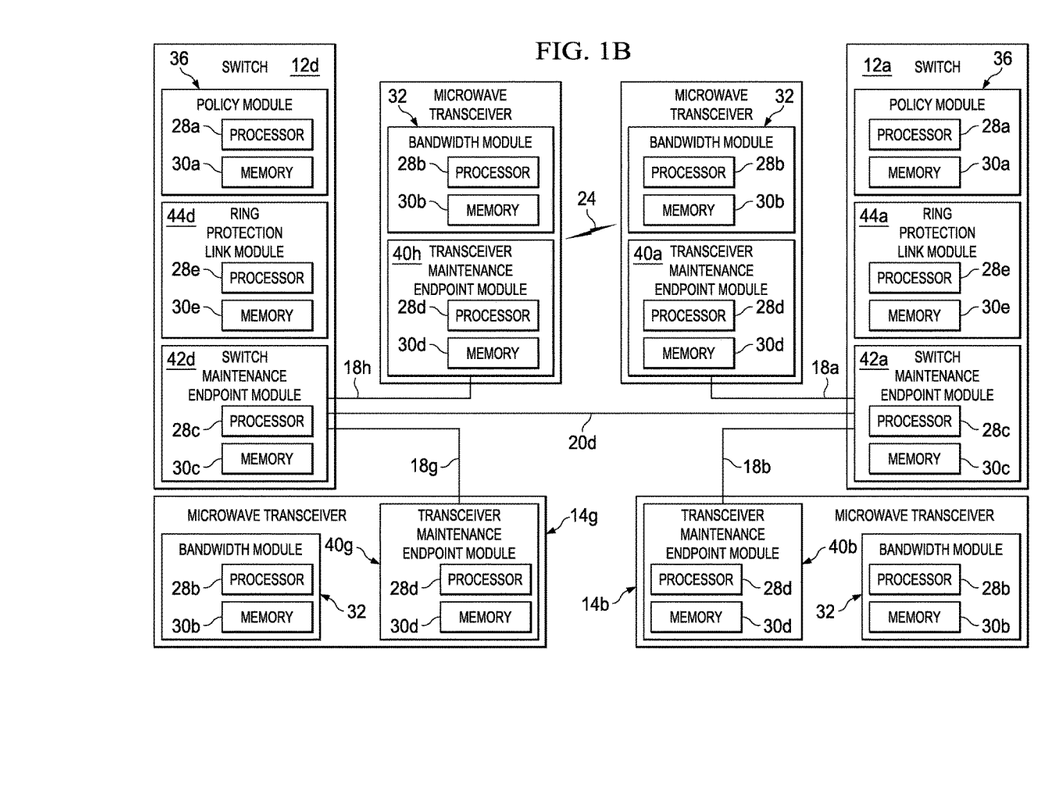
FIG. 1B is a simplified block diagram illustrating possible example details associated with the communication system in accordance with one embodiment of the present disclosure.

Turning to FIG. 1B, FIG. 1B is a simplified block diagram illustrating one possible set of details associated with communication system 10. FIG. 1B may include switches 12a and 12d and microwave transceivers 14a, 14b, 14g, and 14h. In this particular implementation, switch 12a includes policy module 36, S-MEM 42a, and ring protection link (RPL) module 44a, while switch 12d may include a policy module 36, S-MEM 42*d*, and RPL module 44*d*. Policy module 36 may include a processor 28*a* and a memory 30*a*. S-MEMs 42*a* and 42*d* may each include a processor 28*c* and a memory 30*c*. RPL modules 44*a* and 44*d* each include a processor 28*e* and a memory 30*e*. Microwave transceivers 14*a*, 14*b*, 14*g*, and 14*h* each include bandwidth module 32 and T-MEMs 40*a*, 40*b*, 40*g*, and 40*h*, respectively. Bandwidth module 32 may include a processor 28*b* and a memory 30*b*. T-MEMs 40*a*, 40*b*, 40*g*, and 40*h* may each include a processor 28*d* and a memory 30*d*.

S-MEMs 42*a* and 42*d* can communicate with each other over S-MA 20*d*. Microwave transceiver 14*a* can communicate with switch 12*a* using T-MA 18*a*. Microwave transceiver 14*b* can communicate with switch 12*a* using T-MA 18*b*. Microwave transceiver 14*g* can communicate with switch 12*d* using T-MA 18*g*. Microwave transceiver 14*h* can communicate with switch 12*d* using T-MA 18*h*.

In one example, the quality of the radio link between microwave transceiver 14*a* and 14*h* can degrade (e.g., due to rain, snow, etc.). By employing bandwidth module 32, microwave transceiver 14*a* and 14*h* can transition to adaptive modulation and, hence, reduce the bandwidth of the link to a certain value BWx. Using T-MEM 40*a*, microwave transceiver 14*a* can inform switch 12*a* of the new bandwidth (e.g., via a CFM/Y.1731 message). This information could be carried as a TLV within CCMs transmitted by T-MEM 40*a*, or provided as a new Y.1731 message, or carried in some other format/messaging protocol.

In addition, microwave transceiver 14*h* may inform switch 12*d* of the new bandwidth. Switches 12*a* and 12*d* can execute an enhanced version of G.8032 Ring APS (R-APS), where the protection switching is based on the detection of CFM loss of continuity, in addition to the adaptive bandwidth information. In this example, S-MEM 42*a* is responsible for parsing the received adaptive bandwidth information, and S-MEM 42*a* can inform policy module 36 of the bandwidth information advertised by the microwave transceiver. Policy module 36 may compare the bandwidth to one or more thresholds and if the thresholds are crossed, then RPL module 44*a* is notified to initiate an appropriate action. Hence, the degradation of the bandwidth on microwave link 24 can be communicated to a switch, where a fail-over action can be initiated if necessary. Note that the broad term 'compare' as used herein in this Specification is meant to include evaluating, assessing, matching, associating, or otherwise identifying a given element or object.

Figure 2A:
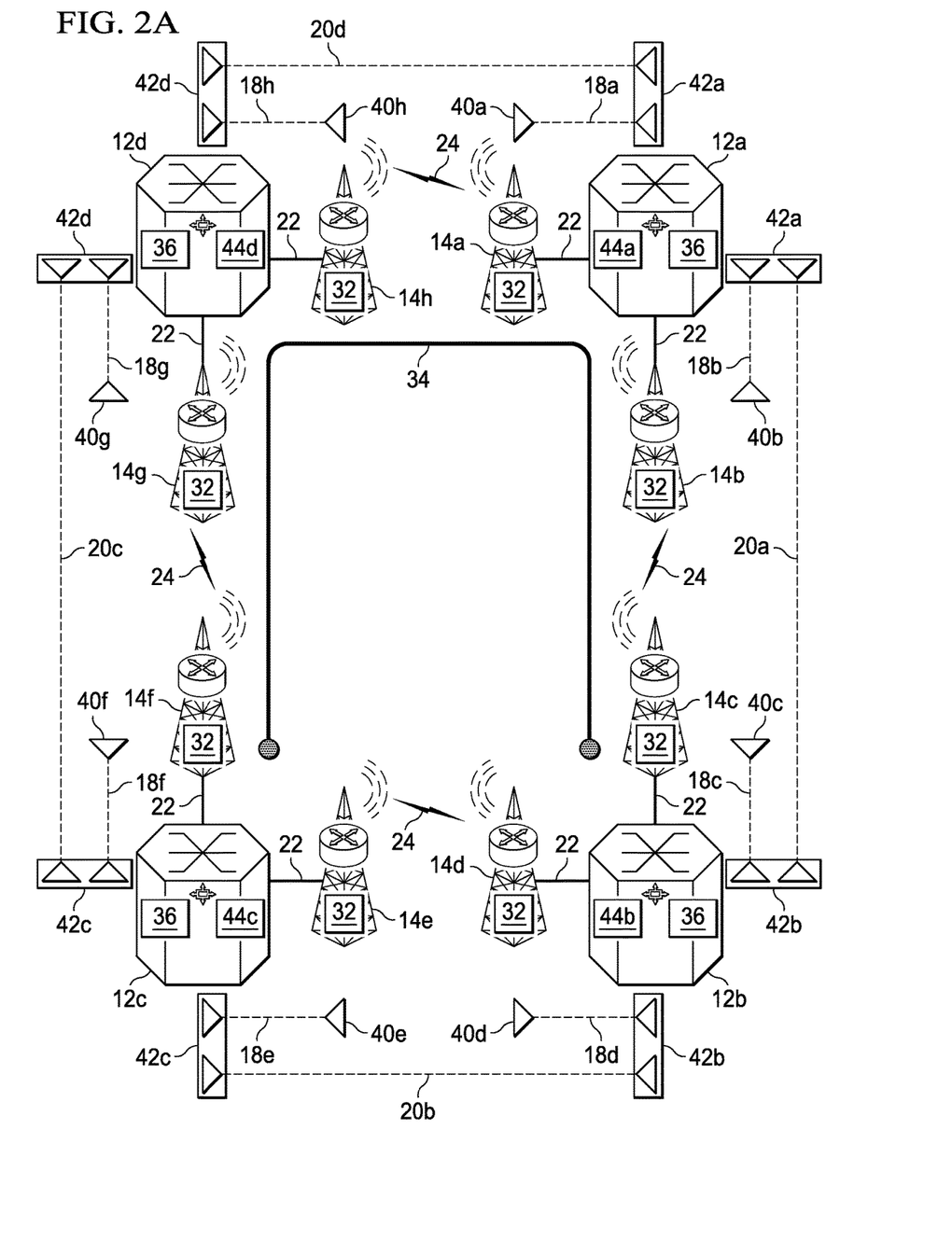
FIG. 2A is a simplified block diagram illustrating possible example details associated with the communication system in accordance with one embodiment of the present disclosure.

Turning to FIG. 2A, FIG. 2A is a simplified block diagram illustrating one possible set of details associated with communication system 10. FIG. 2A may include switches 12*a-d*, microwave transceivers 14*a-h*, T-MAs 18*a-h*, S-MAs 20*a-d*, Ethernet links 22, and microwave link 24. Each of microwave transceivers 14*a-h* may include an instance of bandwidth module 32. While T-MEMs 40*a-h* are shown outside microwave transceivers 14*a-h*, microwave transceivers 14*a-h* can include T-MEMs 40*a-h* (e.g., as shown in FIG. 1B for microwave transceivers 14*a*, 14*b*, 14*g*, and 14*h*). Each switch 12*a-d* may include policy module 36 and RPL modules 44*a-d*. While S-MEMs 42*a-d* are shown outside switches 12*a-d*, switches 12*a-d* may include S-MEMs 42*a-d* (e.g., as shown in FIG. 1B for switches 12*a* and 12*d*). A signal 34 is representative of the potential traffic propagating around the ring.

RPL module 44*a-d* are configured for loop avoidance. Loop avoidance in an Ethernet ring can be achieved by allowing traffic to flow on all but one of the ring links (e.g., the link between switches 12*b* and 12*c*). The link where traffic does not flow is commonly called an RPL, and under normal conditions the RPL is blocked and not used for service traffic. For example, switch 12*c* may be a designated Ethernet ring node that is responsible for blocking traffic at one end of the link such that traffic cannot flow between switches 12*b* and 12*c*. In another example, switch 12*b* may be the designated Ethernet ring node that is responsible for blocking traffic. Under an Ethernet ring failure condition, switch 12*c* (or switch 12*b*) may be responsible for unblocking its end of the RPL (unless the RPL has failed), allowing the RPL to be used for traffic.

Figure 2B:
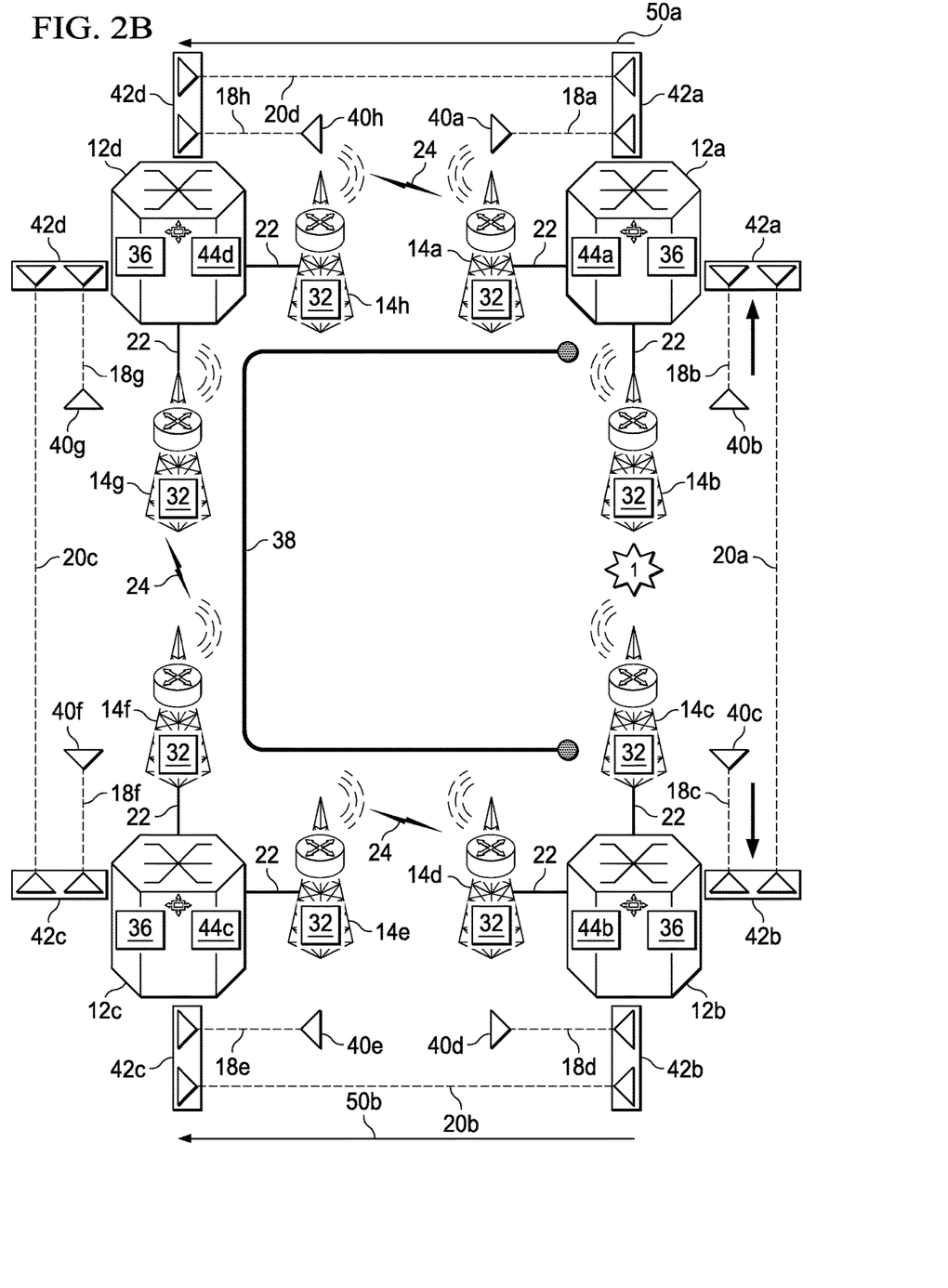
FIG. 2B is a simplified block diagram illustrating possible example details associated with the communication system in accordance with one embodiment of the present disclosure.

Turning to FIG. 2B, FIG. 2B is a simplified block diagram illustrating one possible set of details associated with communication system 10. FIG. 2B may include switches 12*a-d*, microwave transceivers 14*a-h*, T-MAs 18*a-h*, S-MAs 20*a-c*, an Ethernet link 22, and microwave link 24. Each microwave transceiver 14*a-h* may include bandwidth module 32. As in FIG. 2A, while T-MEMs 40*a-h* are shown outside microwave transceivers 14*a-h*, microwave transceivers 14*a-h* may contain T-MEMs 40*a-h*. Each switch 12*a-d* may include policy module 36 and RPL modules 44*a-d*. In one embodiment, each switch 12*a-d* may include more than one policy module 36. As in FIG. 2A, while S-MEMs 420*a-d* are shown outside switches 12*a-d*, switches 12*a-d* may contain S-MEMs 42*a-d*. A new signal 38 represents the traffic propagating around the ring. Using new signal 38, the ring is blocked between switch 12*a* and 12*b*, instead of switch 12*b* and 12*c*.

New signal 38 may have been created due to an Ethernet ring failure condition. For example, the quality of the radio link between microwave transceiver 14*b* and 14*c* may have degraded (e.g., due to rain). As a result, microwave transceiver 14*b* and 14*c* would transition to adaptive modulation and reduce the bandwidth of the link to a certain value BWx. Using bandwidth module 32, microwave transceiver 14*b* informs switch 12*a* of the new bandwidth via a CFM/Y.1731 message. Such information could be carried as a TLV within CCMs, or provided with a new Y.1731 message. In addition, microwave transceiver 14*c* can inform switch 12*b* of the new bandwidth.

Switches 12*a* and 12*b* execute an enhanced version of G.8032 Ring APS (R-APS), where the protection switching is based on the detection of CFM loss of continuity, in addition to the adaptive bandwidth information. The bandwidth level can be compared to a threshold level to determine if a fail-over should be triggered. [Note that the broad term 'determine' in such contexts is meant to include evaluating, identifying, analyzing, examining, assessing, etc.] In this example, the bandwidth level (i.e., BWx) is below the threshold and a fail-over is triggered. Thus, the RPL link between switches 12*b* and 12*c* (as shown in FIG. 2A) is unblocked, and switches 12*a* and 12*b* block the link between them for the failed-over ERP instances. A set of arrows 50*a* and 50*b* show that traffic flows away from the degraded link, for the failed-over ERP instances.

Figure 3:
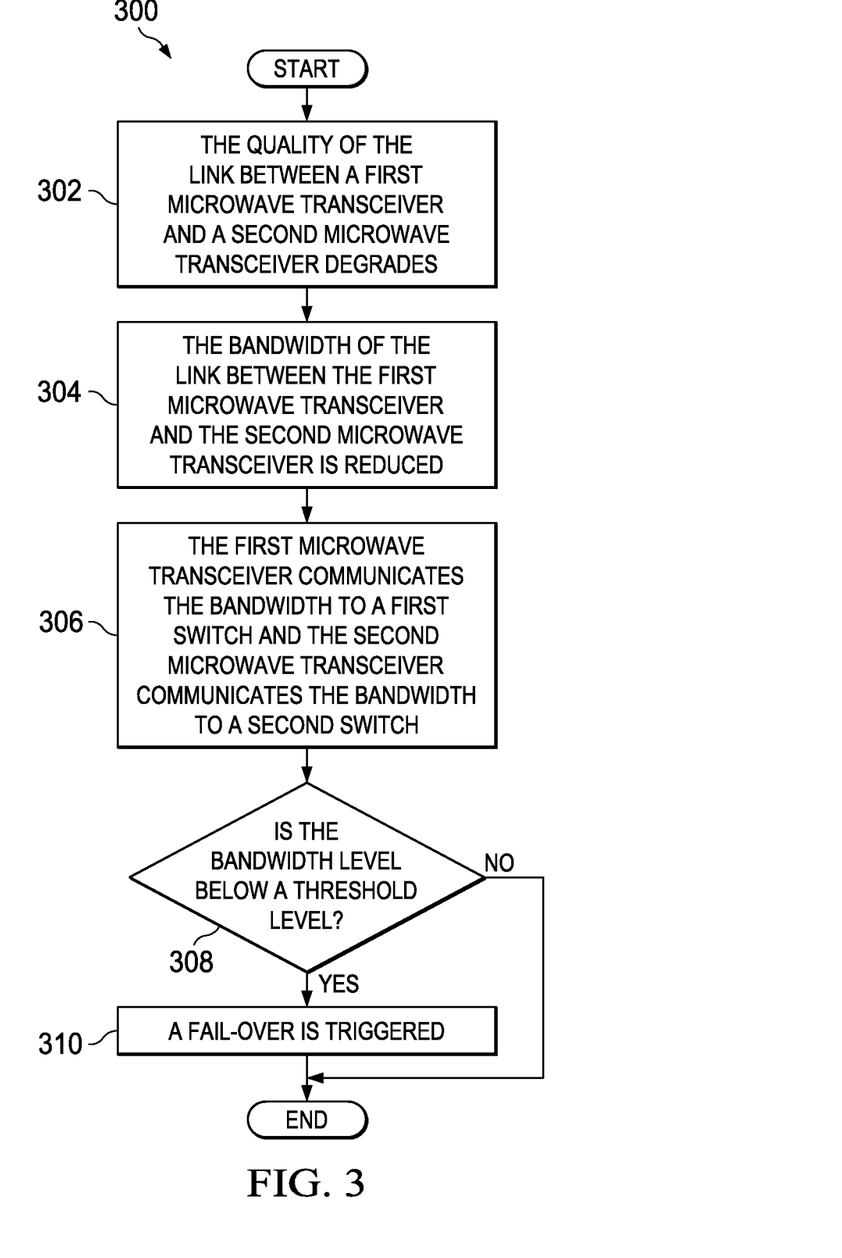
FIG. 3 is a simplified flowchart illustrating potential operations associated with the communication system.

Turning to FIG. 3, FIG. 3 is a simplified flowchart 300 illustrating one potential operation associated with the present disclosure. At 302, the quality of the link between a first microwave transceiver and a second microwave transceiver degrades. For example, the microwave link between microwave transceiver 14*a* and microwave transceiver 14*h* degrades due to some natural environmental condition. At 304, the bandwidth of the link between the first microwave transceiver and the second microwave transceiver is reduced. At 306, the first microwave transceiver communicates the (reduced) bandwidth to a first switch and the second microwave transceiver communicates the (reduced) bandwidth to a second switch. For example, microwave transceiver 14a uses T-MEM 40a to send an OAM message over MA 18a to switch 12a, and microwave transceiver 14h uses T-MEM 40h to send an OAM message over MA 18H to switch 12d to communicate the reduced bandwidth.

At 308, the system is configured to determine if the bandwidth level is below a threshold. For example, policy module 36 may determine if the bandwidth level is below a certain threshold. If the bandwidth level is below a threshold, then a fail-over is triggered, as in 310. The fail-over may be a fail-over of one or more ERP instances to change direction of traffic on the ring such that any remaining traffic that continues to traverse the degraded microwave link does not exceed its new bandwidth BWx. In another embodiment, the fail-over may trigger all ERP instances on the ring when the reported microwave link bandwidth drops below a ring-wide threshold.

Figure 4:
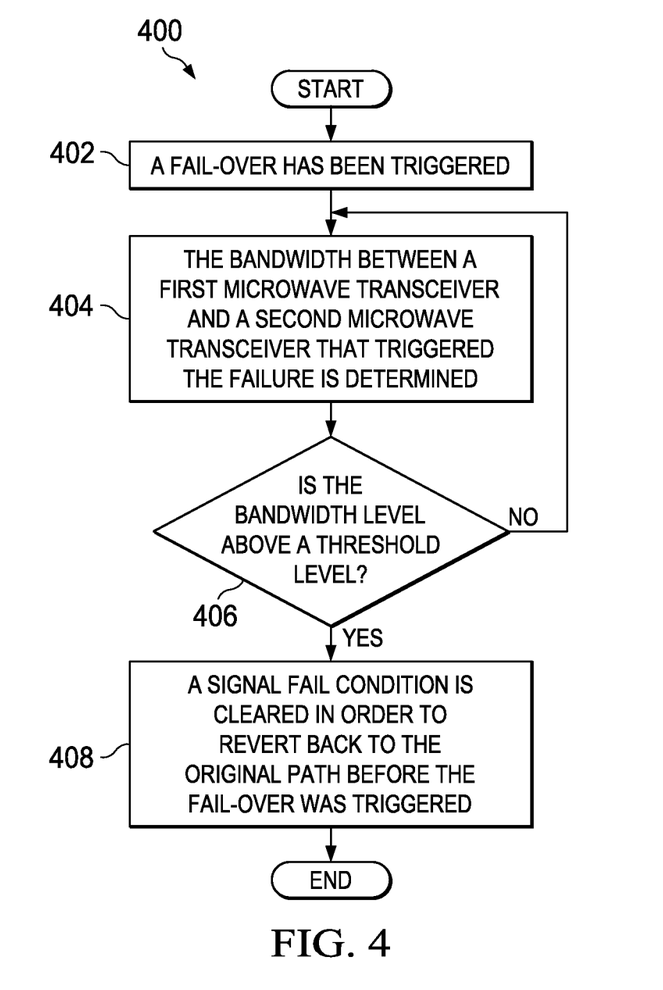
FIG. 4 is another simplified flowchart illustrating potential operations associated with the communication system.

Turning to FIG. 4, FIG. 4 is a simplified flowchart 400 illustrating one potential operation associated with the present disclosure. At 402, a fail-over has been triggered. For example, a fail-over may have been triggered because the bandwidth across a link was too low. At 404, the bandwidth between a first microwave transceiver and a second microwave transceiver that triggered the fail-over is determined. For example, the bandwidth between microwave transceiver 12a and microwave transceiver 12h may be determined. At 406, the system determines if the bandwidth level is above a threshold level.

If the bandwidth level is above the threshold level, then a signal fail or signal degrade (or a manual switch condition) is cleared in order to revert back to the original path before the fail-over was triggered, as in 408. If the bandwidth level is not above the threshold level, then the bandwidth between a first microwave transceiver and a second microwave transceiver that triggered the fail-over is determined, as in 404. The bandwidth evaluation algorithm may be rerun repeatedly as the Ethernet switch receives updated information from the microwave transceiver and, based on these updates, the switch may decide to revert a subset (but not all) of the ERP instances Note that in certain example implementations, the ring protection functions outlined herein may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1B] can store data used for the operations described herein. This includes the memory element being able to store logic (e.g., software, code, processor instructions, etc.) that can be executed to carry out the activities described in this Specification. A processor can execute any type of instructions associated with the data to achieve the operations detailed herein in this Specification. In one example, the processor [as shown in FIG. 1B] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 10 may be applicable to other protocols and arrangements. Moreover, the present disclosure is equally applicable to various technologies, aside from RAN architectures, as these have only been offered for purposes of discussion. Along similar lines, communication system 10 can be extended to any communications involving ring protection activities, where such activities are not necessarily tied to a given standard. Some of the standards and protocols referenced herein have simply been identified for purposes of discussion. In alternative embodiments, the ring protection can apply to other paradigms having little (or no) relevance to defined RFCs, standards, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a connectivity fault management message that includes a bandwidth level associated with a link, which is provided between a first microwave transceiver and a second microwave transceiver, wherein the link is part of a communication ring that includes multiple Ethernet ring protection elements and at least two maintenance associations per segment of the communication ring, wherein at least one of the Ethernet ring protection elements is defined in International Telecommunication Union-Telecommunication Standardization Sector (ITU-T) G.8032, wherein one maintenance association extends from a first switch in the communication ring to a second switch in the communication ring and a second maintenance association extends from the first switch to the first microwave transceiver;
    comparing the bandwidth level associated with the link to a threshold level, wherein the threshold level indicates a maximum bandwidth required for at least one virtual local area network; and
    triggering a fail-over for a selected one of the plurality of Ethernet ring protection elements using a ring automated protection switching message if the bandwidth level is below the threshold level, wherein the bandwidth level does not indicate loss of connectivity but a degradation condition.

2. The method of claim 1, further comprising:
    receiving first data associated with the link from a maintenance endpoint (MEP) that is responsible for detecting a loss of connectivity on the link; and
    receiving second data associated with the link from a second MEP, wherein the second data is associated with adaptive bandwidth information advertised by the first microwave transceiver.

3. The method of claim 1, further comprising:
    receiving bandwidth information for the link, wherein the bandwidth information is provided in a type length value (TLV) within a continuity check message (CCM) from a maintenance endpoint.

4. The method of claim 1, wherein the ring automated protection switching message includes a signal fail condition.

5. The method of claim 1, wherein the ring automated protection switching message that includes a signal degrade condition.

6. The method of claim 1, wherein the ring automated protection switching message that includes a manual switch condition.

7. The method of claim 1, wherein the communication ring is assigned an individual bandwidth threshold for triggering a particular fail-over.

8. The method of claim 1, wherein each of the Ethernet ring protection elements is assigned an individual bandwidth threshold for triggering a particular fail-over and further comprising:
    comparing the bandwidth level against the assigned individual bandwidth threshold for each Ethernet ring protection element in order to apply the particular fail-over on a particular one of the Ethernet ring protection elements.

9. The method of claim 1, wherein the first microwave transceiver and the second microwave transceiver implement an adaptive modulation protocol on the link.

10. The method of claim 1, wherein the at least two maintenance associations are connectivity fault management maintenance associations.

11. The method of claim 1, wherein the bandwidth level is provided by a switch maintenance endpoint module.

12. The method of claim 1, wherein the first microwave transceiver is directly in communication with the first switch.

13. The method of claim 1, wherein the at least one virtual local area network is associated with a NodeB that includes a radio spectrum, wherein the radio spectrum of the NodeB dictates the maximum bandwidth.

14. Logic encoded in one or more non-transitory media that includes instructions for execution and when executed by a processor is operable to perform operations, comprising:
    receiving a connectivity fault management message that includes a bandwidth level associated with a link, which is provided between a first microwave transceiver and a second microwave transceiver, wherein the link is part of a communication ring that includes multiple Ethernet ring protection elements and at least two maintenance associations per segment of the communication ring, wherein at least one of the Ethernet ring protection elements is defined in International Telecommunication Union-Telecommunication Standardization Sector (ITU-T) G.8032, wherein one maintenance association extends from a first switch in the communication ring to a second switch in the communication ring and a second maintenance association extends from the first switch to the first microwave transceiver;
    comparing the bandwidth level associated with the link to a threshold level, wherein the threshold level indicates a maximum bandwidth required for at least one virtual local area network; and
    triggering a fail-over for a selected one of the plurality of Ethernet ring protection elements using a ring automated protection switching message if the bandwidth level is below the threshold level, wherein the bandwidth level does not indicate loss of connectivity but a degradation condition.

15. The logic of claim 14, the operations further comprising:
    receiving first data associated with the link from a maintenance endpoint (MEP) that is responsible for detecting a loss of connectivity on the link; and
    receiving second data, which is associated with adaptive bandwidth information advertised by the first microwave transceiver.

16. The logic of claim 14, the operations further comprising:
    receiving bandwidth information for the link, wherein the bandwidth information is provided in a type length value (TLV) within a continuity check message (CCM).

17. The logic of claim 14, wherein the first microwave transceiver and the second microwave transceiver implement an adaptive modulation protocol on the link.

18. An apparatus, comprising:
    a memory element configured to store instructions;
    a processor coupled to the memory; and
    a ring protection module, wherein the processor is operable to execute the instructions such that the apparatus is configured for:
        receiving a connectivity fault management message that includes a bandwidth level associated with a link, which is provided between a first microwave transceiver and a second microwave transceiver, wherein the link is part of a communication ring that includes multiple Ethernet ring protection elements and at least two maintenance associations per segment of the communication ring, wherein at least one of the Ethernet ring protection elements is defined in International Telecommunication Union-Telecommunication Standardization Sector (ITU-T) G.8032, wherein one maintenance association extends from a first switch in the communication ring to a second switch in the communication ring and a second maintenance association extends from the first switch to the first microwave transceiver;

comparing the bandwidth level associated with the link to a threshold level, wherein the threshold level indicates a maximum bandwidth required for at least one virtual local area network; and triggering a fail-over for a selected one of the plurality of Ethernet ring protection elements using a ring automated protection switching message if the bandwidth level is below the threshold level wherein the bandwidth level does not indicate loss of connectivity but a degradation condition.

19. The apparatus of claim 18, wherein the apparatus is further configured for:

receiving first data associated with the link from a maintenance endpoint (MEP) that is responsible for detecting a loss of connectivity on the link; and receiving second data, which is associated with adaptive bandwidth information advertised by the first microwave transceiver.

20. The apparatus of claim 18, wherein the apparatus is further configured for:

receiving bandwidth information for the link, wherein the bandwidth information is provided in a type length value (TLV) within a continuity check message (CCM).

* * * * *